(12) United States Patent
Chen (10) Patent No.: US 6,234,501 B1
(45) Date of Patent: May 22, 2001

(54) FOLDABLE SCOOTER WITH HEAD TUBE ASSEMBLY, BRAKE AND SUSPENSION

(76) Inventor: Chih-Liang Chen, No. 10, Lane 1431, Kuanghsing Rd., Pateh City, Taoyuan Hsien (TW)

( * ) Notice: Subject to any disclaimer, the term of this patent is extended or adjusted under 35 U.S.C. 154(b) by 0 days.

(21) Appl. No.: 09/558,621

(22) Filed: Apr. 26, 2000

(51) Int. Cl.⁷ ..................................................... B62M 1/00
(52) U.S. Cl. .................... 280/87.041; 16/900; 280/87.05
(58) Field of Search ............................ 280/87.041, 87.05, 280/87.01, 87.021, 87.042, 14.27, 14.28, 809, 264; 403/116, 113, 91, 103; 16/357, 360, 900; 188/29, 57, 22, 9, 19

(56) References Cited

U.S. PATENT DOCUMENTS

| | | | | |
|---|---|---|---|---|
| 1,701,410 | * | 2/1929 | Hornquist | 280/87.5 |
| 2,051,762 | * | 8/1936 | Vincent | 280/87.5 |
| 3,006,659 | * | 10/1961 | Krasnoff et al. | 280/221 |
| 4,394,029 | * | 7/1983 | Holmgren | 280/11.23 |
| 4,707,884 | * | 11/1987 | Chang | 16/113 |
| 5,927,733 | * | 7/1999 | Banda | 280/87.041 |
| 6,120,044 | * | 9/2000 | Tsai | 280/87.05 |
| B1 6,173,976 | * | 1/2001 | Lee | 280/87.05 |
| B1 6,179,307 | * | 1/2001 | Mao | 280/87.041 |
| B1 6,182,988 | * | 2/2001 | Wu | 280/87.05 |

FOREIGN PATENT DOCUMENTS

0515597 * 4/1921 (FR) ................................ 280/87.041

* cited by examiner

Primary Examiner—Brian L. Johnson
Assistant Examiner—Gerald Klebe
(74) Attorney, Agent, or Firm—Hedman & Costigan, P.C.

(57) ABSTRACT

A foldable scooter has a head tube pivot assembly having a seat with two wings, a head tube with a push bar, a lever and a rocker. The head tube is able to be pivotally received between the wings. The lever, the push bar and the rocker are simultaneously moveable relative to the head tube, such that a hook on the push bar is able to detachably engage with one end of a limit pin to release or secure the head tube. A front wheel suspension spring is provided on both sides of the front wheel to function as a damper to smooth the ride. A brake assembly is provided on the rear wheel. The brake assembly has a fender with a brake pad securely attached thereto such that the friction between the brake pad and the rear wheel enhances the braking effect to the scooter.

11 Claims, 7 Drawing Sheets

FOLDABLE SCOOTER WITH HEAD TUBE ASSEMBLY, BRAKE AND SUSPENSION

BACKGROUND OF THE INVENTION

1. Field of the Invention

The present invention relates to a scooter, and more particularly to a foldable scooter with an improved brake assembly.

2. Description of Related Art

Normally, a scooter has a foldable handle, such that not much space is needed when the scooter is put away for storage. A conventional scooter usually includes a head tube, a base pivotally connected to the head tube, a frontwheel assembly rotatably connected to the head tube and another wheel assembly rotatably mounted on the opposite end of the base. The pivotal connection between the base and the head tube is achieved by a combination of a bolt and nut whereby the bolt is inserted through both the base and the head tube, and the nut is used to tighten and hold the head tube in position. With such an arrangement, at least two separated through holes are defined in the base. One hole is defined to hold the handlebar in an upright position relative to the base, and the other hole is defined to secure the handlebar in a horizontal or stowed position relative to the base. This type of scooter needs an extra tool(s) for assembly and disassembly, which makes the scooter inconvenient to the user.

Still, there is another type of conventional connection between the base and the head tube. This connection is achieved by a bolt and spring combination. That is, with the bolt and spring combination, the user is able to readily change the relative position between the handlebar and the base. Although, the scooter provides an easy connection structure between the base and the handlebar, the connection between the base and the handlebar is not as secured as it should be. That is to say, when the scooter of this type is in use, the handlebar will shake and make the user standing on the base very unstable and unsafe.

To overcome the shortcomings, the present invention tends to provide a scooter enabling the user to easily disassemble the connection between the head tube and the base so as to mitigate and obviate the aforementioned problems.

SUMMARY OF THE INVENTION

The main objective of the invention is to provide a scooter with a handlebar that can be easily folded for storage. The scooter has a head tube movably connected to a pivot assembly that is securely mounted on top of the base. By means of the pivotal movement of a pivot pin, the position of the head tube relative to the base can be easily changed.

Still another objective of the invention is to provide an improved brake assembly to the scooter. With the newly developed brake assembly, the braking capacity is greatly increased.

A further objective of the invention is to provide an improved suspension system to the scooter, such that the user will have a comfortable ride when using the scooter of the invention.

Other objects, advantages and novel features of the invention will become more apparent from the following detailed description when taken in conjunction with the accompanying drawings.

DETAILED DESCRIPTION OF PREFERRED EMBODIMENT

Figure 1:
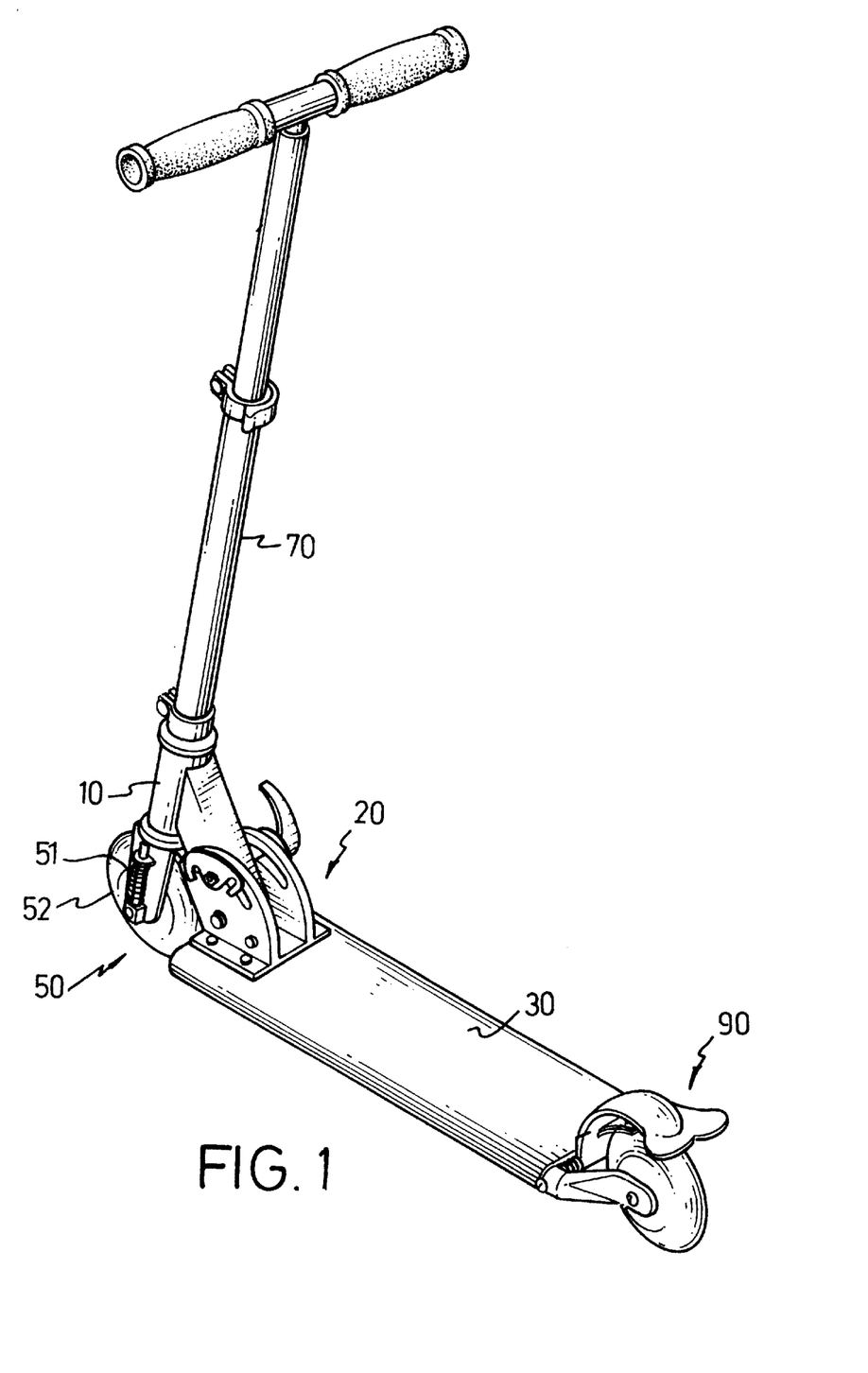
FIG. 1 is a perspective view of the scooter in accordance with the present invention.
Figure 6:
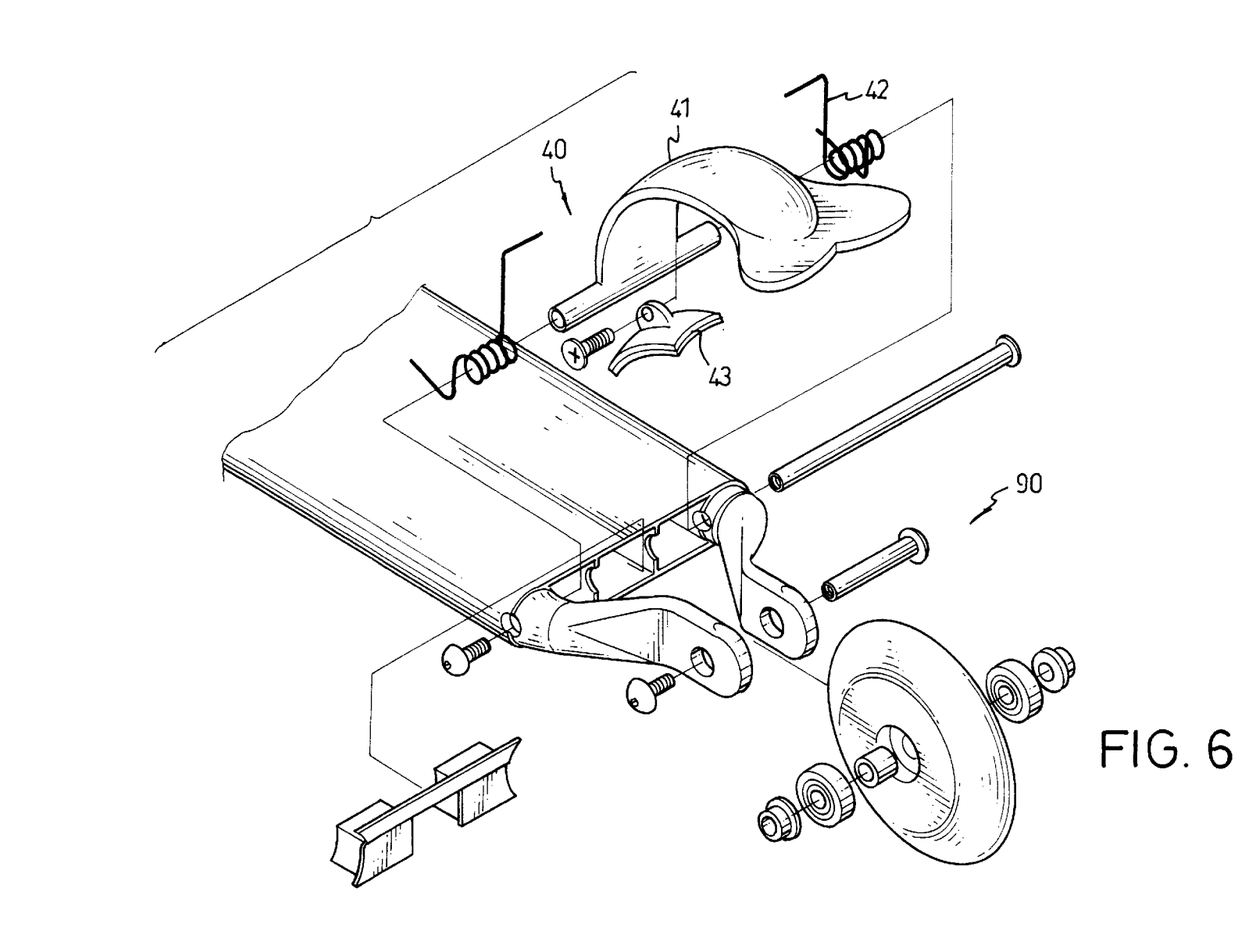
FIG. 6 is an exploded perspective view of the rear wheel and brake assemblies.

With reference to FIGS. 1 and 6, the scooter in accordance with the present invention has a head tube (10), pivot assembly (20), a base (30), a front wheel assembly (50), a handlebar (70), a rear wheel assembly (90) and a brake assembly (40). The head tube (10) is pivotally connected to the front end of the base (30). The front wheel assembly (50) is rotatably mounted in the head tube (10). The handlebar (70) is securely connected to the front wheel assembly (50). The rear wheel assembly (90) is rotatably connected to the base (30). The brake assembly (40) is mounted on the rear to the base (30) and operates in conjunction with the rear wheel assembly (90).

Figure 2:
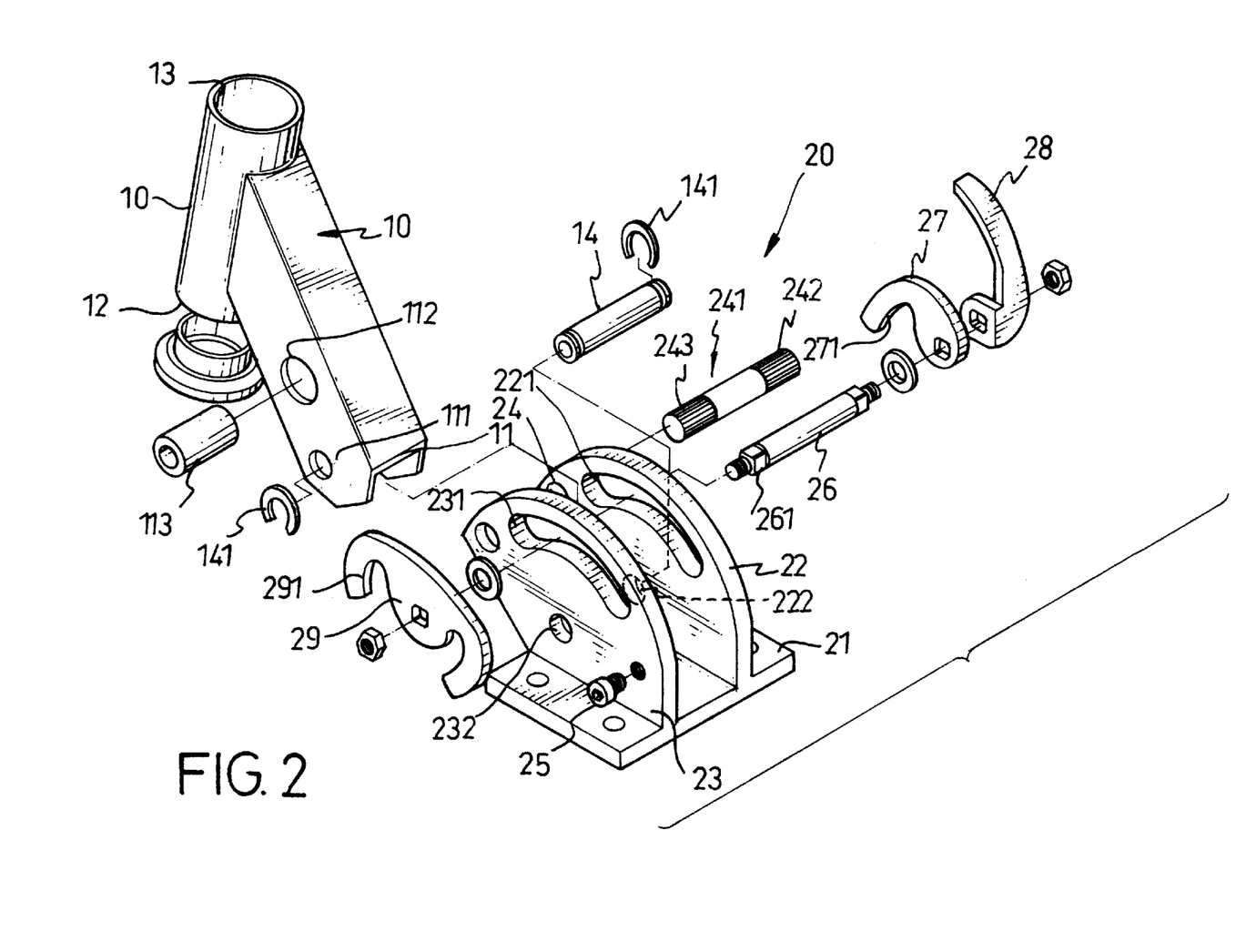
FIG. 2 is an exploded perspective view of the retaining member used to connect the handlebar to the base in FIG. 1.

With reference to FIG. 2, the head tube (10) is securely attached to one end of a pivot arm (11). A pair of through holes (111) are defined near the other end of the pivot arm (11). Another pair of through holes (112) are defined near the middle of the pivot arm (11), and a bushing (113) pressed into the through holes (112). The free end of the pivot arm (11) is pivotally connected to the base (30) via the pivot assembly (20).

The pivot assembly (20) has a seat (21) securely mounted on the base (30), a push bar (27), a lever (28) and a rocker (29). A pair of symmetric, parallel wings (22, 23) extend upward from the seat (21). Each wing (22, 23) has an elongated arcuate slot (221, 231) in the upper portion near the edge. A pivot hole (222, 232) is defined in each of the wings (22, 23). A limiting hole (24) is defined in each of the wings (22, 23) near the front end of each elongated slot (221, 231) to receive a limit pin (241). The ends of the limit pin (241) protrude out of the wings (22, 23). Rubber with a wave-like pattern is bonded to the exposed ends (242, 243) of the limit pin (241). A stop post (25) protrudes out from the outer side face of each of the wings (22, 23) at the opposite end of the elongated slots (221, 231) from the limiting holes (24). The push bar (27), the lever (28) and the rocker (29) are securely connected to each other by means of a connector (26) that is movably received in the arcuate slots (221, 231). The push bar (27) has a hook (271) on the free end and the rocker (29) has hook (291) formed on each free end. To ensure that the relative position of the push bar (27), the lever (28) and the rocker (29) does not change, the ends of the connector (26) and the holes (not numbered) in the push bar (27), the lever (28) and the rocker (29) are keyed. It is also noted that the front wheel assembly (50) has a suspension spring (51) a first end of which is securely engaged with the head tube (10) and a second end of which is securely with an axis of a front wheel (52). Accordingly, when the scooter of the present invention is in use, the user is able to have a comfortable riding because of the absorption of shock by the suspension spring (51).

To assemble the head tube (10) with the pivot assembly (20), the seat (21) is securely mounted on the base (30) and the bushing (113) is first received between the first pair of through holes (112) in the pivot arm (10). The pivot arm (11) attached to the head tube (10) is inserted between the wings (22, 23) to align the holes (111) near the end of the pivot arm (11) with the holes (222, 232) in the wings (22, 23). A pivot pin (14) is inserted through the aligned holes (222, 111, 232) and extends out from the holes (222, 232) in the wings (22,23). A C-ring (141) clipped on each end of the pivot pin (14) to hold the pivot pin (14) in the holes (222, 111, 232) such that the free end of the pivot arm (11) is able to pivot relative to the seat (21). The limit pin (241) is pressed into the limit holes (24) such that the ends (242, 243) protrude out from the the limiting holes (24) to expose the wave-like rubber patterns. Finally, the connector (26) is inserted through the two arcuate slots (221, 231) and the through holes (112) near the middle of the pivot arm (11). The rocker (29) is secured on one keyed end of the connector (26), and the push bar (27) and lever (28) are secured on the other keyed end of the connector (26). The forward hook (291) on the rocker (29) and hook (271) on the push bar (27) are aligned to simultaneously engage or disengage the ends (242, 243) of the limit pin (241).

Figure 3:
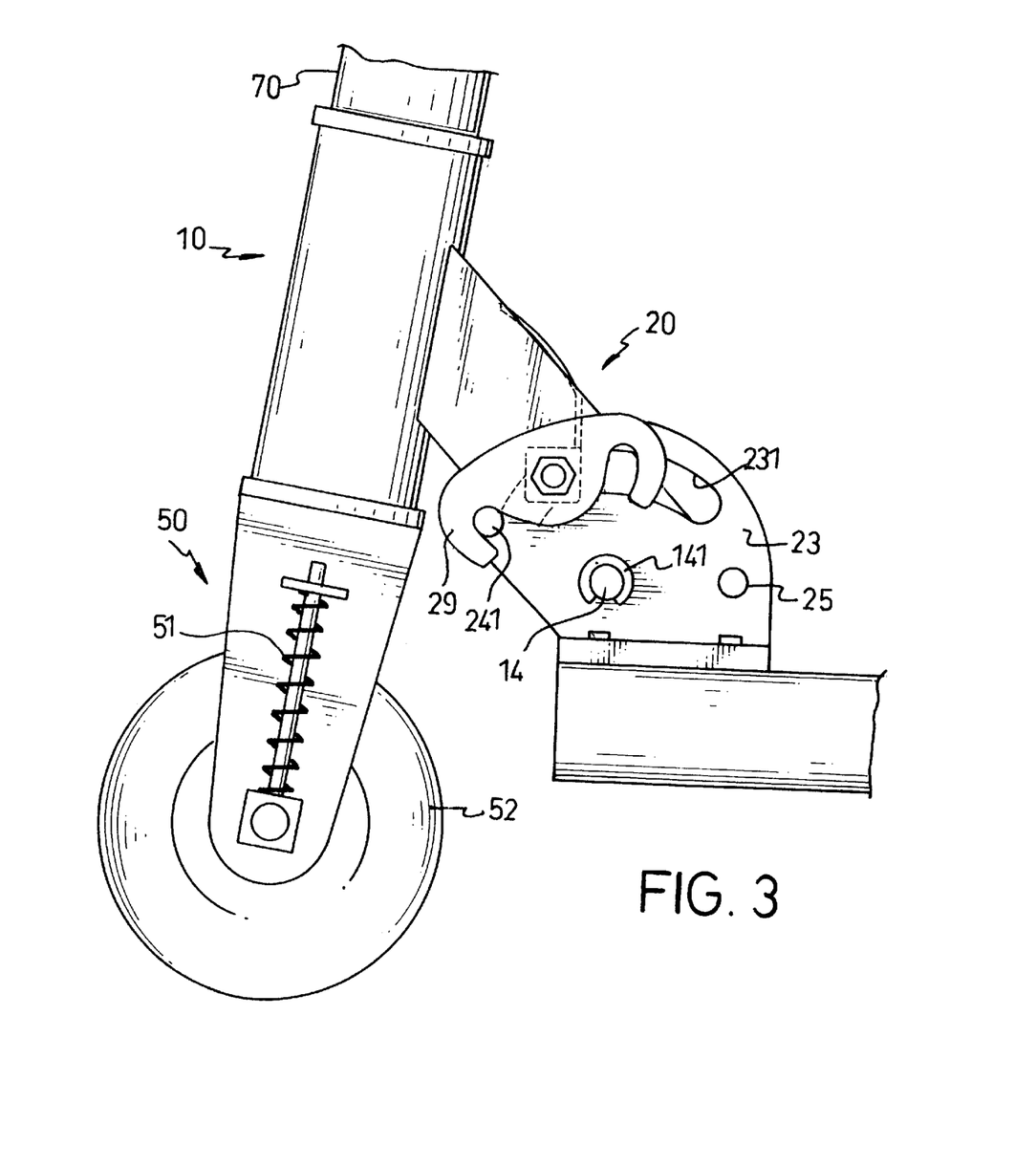
FIG. 3 is a side plan view of the retaining member in FIG. 2 in an upright or deployed position.

With reference to FIG. 2 and 3, when the scooter is in use, the forward hook (291) on the rocker (29) and the hook (271) on the push bar (27) engage opposite ends (242, 243) of the limit pin (241). Due to the wave-like rubber patterns on the ends (242, 243), the engagement between the hooks (271, 291) and the ends (242, 243) of the limit pin (241) is secure.

Figure 4:
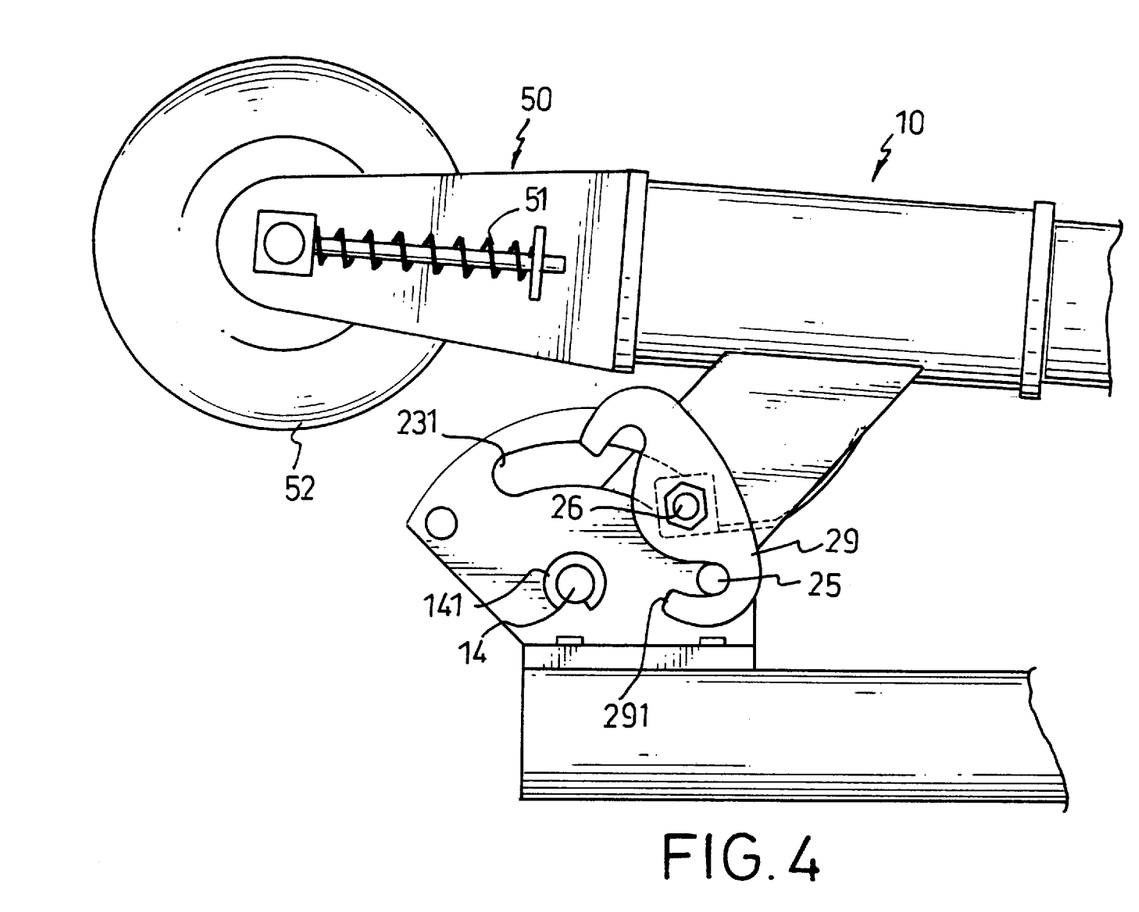
FIG. 4 is a side plan view of the retaining member is in a folded or stowed position.
Figure 5:
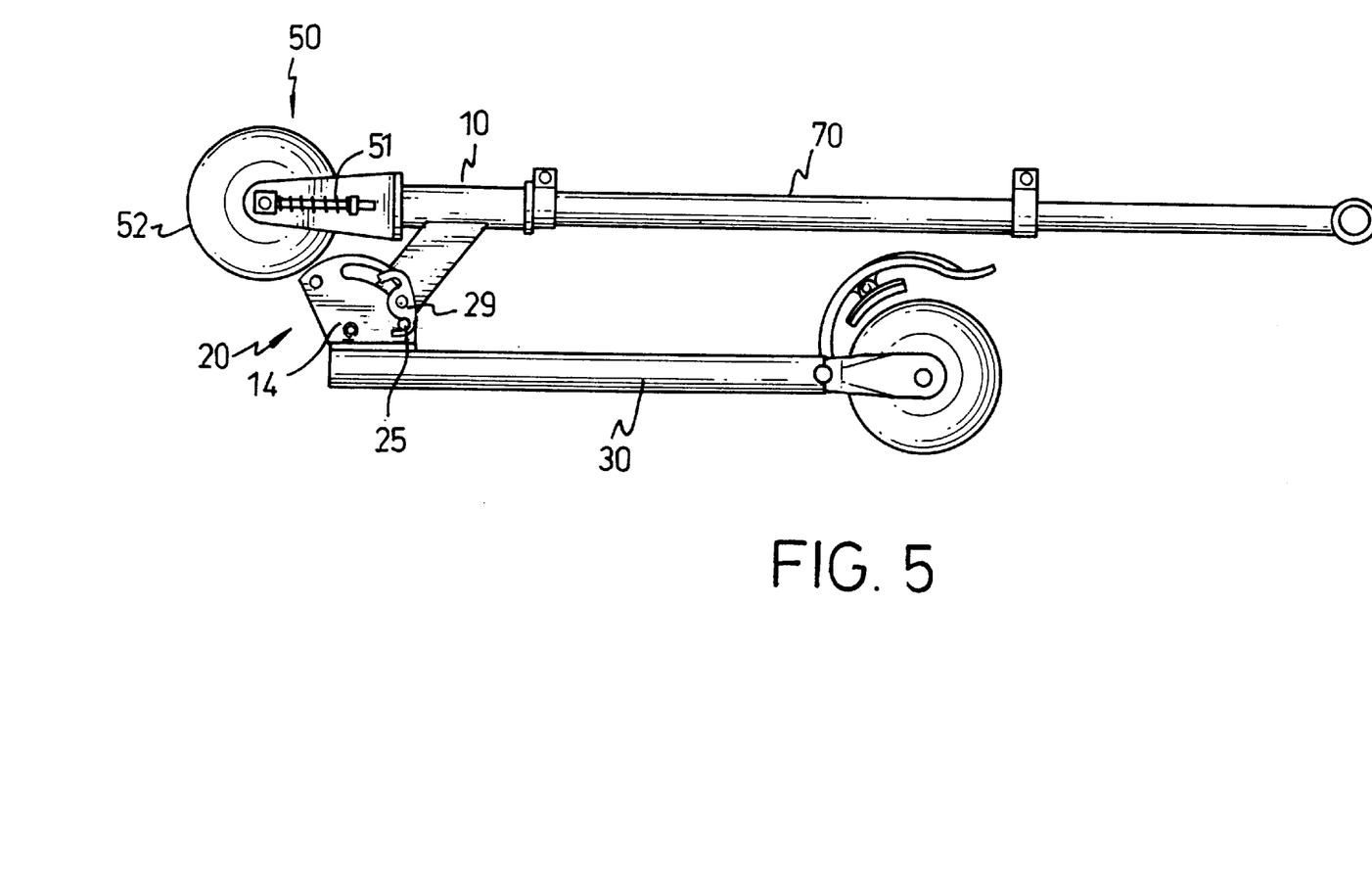
FIG. 5 is a side plan view of the scooter in FIG. 1 showing the handlebar is in horizontal position relative to the base.

With reference to FIGS. 2, 4 and 5, when the scooter is to be put away for storage, the user only needs to pull the lever (28) to disengage the push bar (27) and the rocker (29) from the limit pin (241). Thus, the head tube (10), the handlebar (70) and the front wheel assembly (50) are rotated to a horizontal position relative to the base (30). Eventually, the pivotal movement of the handlebar (70) and the head tube (10) will allow the hook (291) formed on the rear end of the rocker (29) to engage with the stop post (25). The handlebar (70) is securely held in position relative to the base (30). When the user needs to play with the scooter again, the user just pushes the lever (28) to release hook (291) on the rocker (29) from the stop post (25) so the handlebar (70) together with the front wheel assembly (50) can be pivoted to the position where the handlebar (70) is vertical relative to the base (30). The hooks (271, 291) on the rocker (29) and the push bar (27) engage the limit pin (241) to securely hold the handlebar (70) in position.

With reference to FIG. 6, the scooter further has a brake assembly (40) comprising a fender (41), a pair of springs (42), and a brake pad (43). The fender (41) is pivotally connected to the base (30). The ends of the springs (42) are securely held under the base (30) and the underside of the fender (41) to provide a force to hold the fender (41) and the brake pad (43) off the rear wheel (91) when not being used to brake the scooter. The brake pad (43) securely mounted on the under face of the fender (41).

Figure 7:
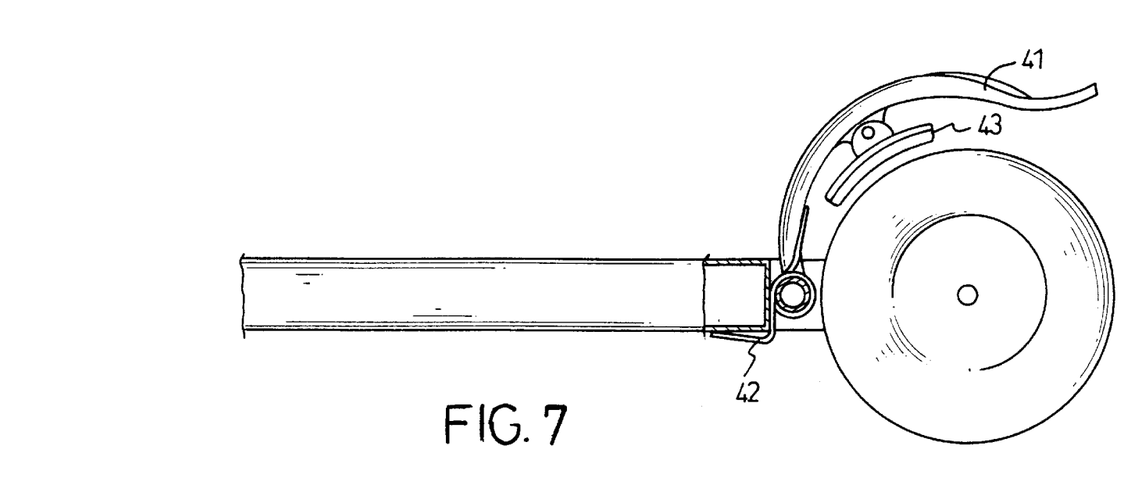
FIG. 7 is a side plan view of the rear wheel assembly in FIG. 6 showing the brake assembly mounted on the base of the scooter.
Figure 8:
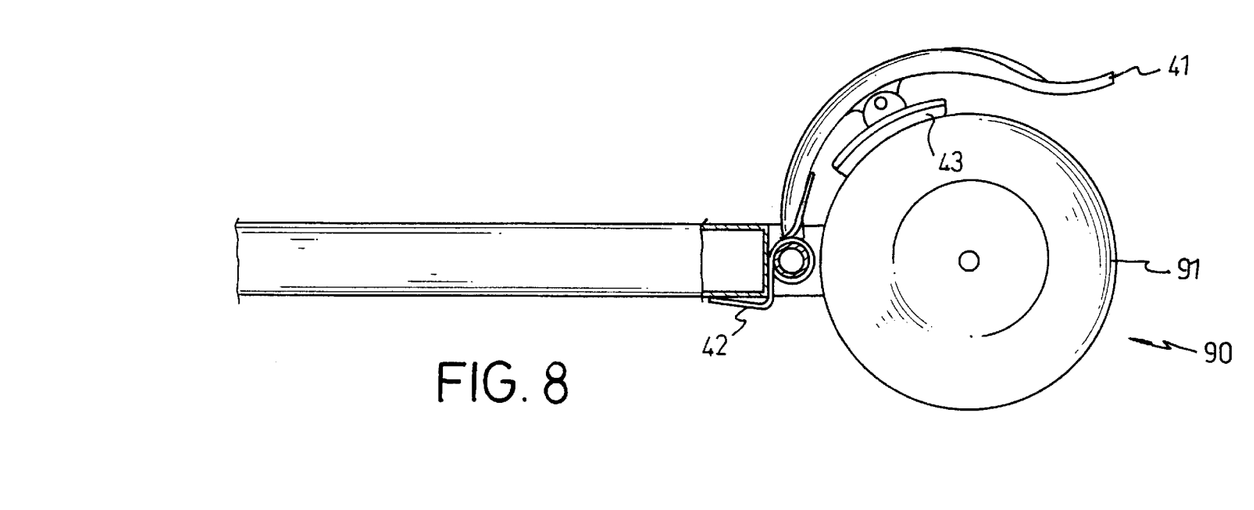
FIG. 8 is an operational side plan view of the rear wheel assembly in FIG. 6 showing the brake assembly is in use.

The brake assembly (40) is mounted on the rear wheel assembly (90) such that the brake pad (43) detachably engages with the outer periphery of the rear wheel (91) to stop or slow the rotation of the wheel (91). The brake pad (43) is made of a material such as rubber. Whenever it is required, the user is able to press the fender (41) to force the brake pad (43) to engage with the wheel (91) so as to stop or slow the rotation of the wheel (91). After the rotation of the wheel (91) is stopped or slowed, releasing the fender (41) will allow the springs (42) to return the fender (41) to its original position.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A scooter comprising a head tube with a pivot arm, a base pivotally connected to the head tube via a pivot assembly, a front wheel assembly rotatably mounted in the head tube, a handlebar securely connected to the front wheel assembly and a rear wheel assembly rotatably connected to the base, wherein the improvements comprise:

the pivot assembly having a seat securely connected to the base and provided with a pair of wings extending upward and each having an elongated arcuate slot in an upper portion thereof, a pair of holes respectively defined to correspond to a pair of through holes in the head tube so as to receive between the holes a pivot pin that secures the pivotal engagement between the free end of the head tube and the seat, a pair of limiting holes in each of the wings for receiving a limit pin that protrides out of the wings and has ribber with a wave-like pattern bonded thereon and a stop post protruding out from an outer side face of each of the wings opposite to the limiting holes, a connector movably received through the arcuate slots, a push bar and a lever securely engaged with a first distal end of the connector wherein the push bar is provided with a first hook detachably engaged with a first end of the limit pin and a rocker securely connected with the connector and having a second hook formed on both ends of the rocker to detachably engage the other end of the limit pin and the stop post.

2. A scooter comprising a head tube, a base pivotally connected to the head tube by means of a pivot assembly, a front wheel assembly rotatably mounted in the head tube, a handlebar securely connected to the front wheel assembly and a rear wheel assembly rotatably connected to the base, wherein the improvements comprise:

the pivot assembly having:
a seat securely attached to the base and provided with a pair of horizontally spaced wings each having an arcuate slot, a limit hole and a stop post, whereby the head tube is able to be pivotally received between the wings;
a limit pin inserted through the limit holes with the two ends of which protrude out from each of the limit holes;
a rocker movably mounted on a side face of one of the wings and two ends of which are provided with a second hook to respectively and detachably engage one end of the limit pin and the stop post; and
a push bar simultaneously movable with the rocker and having a first hook detachably connected with a second end of the limit pin.

3. The scooter as claimed in claim 2 further comprising a lever securely engaged with the push bar.

4. The scooter as claimed in claim 3, wherein a connector is movably received through the arcuate slots and engaged with the lever, the push bar and the rocker respectively.

5. The scooter as claimed in claim 2, wherein the limit in has rubber with a wave-like pattern bonded to each end.

6. The scooter as claimed in claim 2, wherein patterns are formed on each end of the limit pin.

7. The scooter as claimed in claim 2, wherein a hole is defined in each of the wings and each of the holes correspond to each other to receive therebetween the end of the head tube to allow the head tube to be pivotal with respect to the seat.

8. The scooter as claimed in claim 7, wherein a pivot pin is inserted through the aligned holes and the end of the head tube to secure the position of the head tube with respect to the seat.

9. The scooter as claimed in claim 8, wherein a C-clip is attached to each end of the pivot pin to secure the pivot pin in the holes.

10. The scooter as claimed in claim 2, wherein a suspension spring is securely connected between the head tube and a front wheel of the front wheel assembly to function as a cushion.

11. A scooter comprising a head tube, a base pivotally connected to the head tube by means of a pivot assembly, a front wheel assembly rotatably mounted in the head tube, a handlebar securely attached to the front wheel assembly and a rear wheel assembly rotatably connected to the base, wherein the improvements comprise:

the pivot assembly having a seat securely attached to the base and provided with a pair of wings extending upward therefrom and each having an elongated arcuate slot in an upper portion thereof, a pair of holes respectively defined to correspond to a pair of through holes in the head tube to receive a pivot pin through the holes that secure the pivotal engagement between the end of the head tube and the seat, a limit hole in each of the wings to receive a limit pin with two ends protruding out of the wings and having rubber with a wave-like pattern bonded on ends thereof and a stop post protruding out from an outer side face of each of the wings and formed diametrically and oppositely to the limiting holes, a connector movably received through the arcuate slots, a push bar and a lever securely engaged with a first distal end of the connector and having a hook formed on the push bar to detachably engage with one end of the limit pin and a rocker securely connected with the connector and having a hook formed on each end of the rocker to respectively and detachably engage a second end of the limit pin and the stop post;

a suspension spring securely engaged between the head tube and the front wheel assembly; and a brake assembly provided on the rear wheel assembly and having a fender pivotally engaged with the base, a pair of springs located between the base and an underside of the fender to provide a restoring force to the fender to restore the position of the fender after being pivoted and a brake pad securely mounted on the underside of the fender to selectively abut the outer periphery of the rear wheel of the rear wheel assembly.

* * * * *